United States Patent Office 2,974,158
Patented Mar. 7, 1961

2,974,158

PREPARATION OF BI-HETEROCYCLIC PHOSPHORUS CONTAINING COMPOUNDS

William M. Lanham, Charleston, W. Va., assignor to Union Carbide Corporation, a corporation of New York No Drawing. Filed Apr. 2, 1953, Ser. No. 346,525

18 Claims. (Cl. 260—461)

This invention relates to the production of a novel class of phosphorus-containing compounds comprising a plurality of 5- and 6-membered heterocyclic groups, each containing at least one phosphorus atom in the ring. The invention has especial utility for the production of a class of novel and useful compounds containing two 5- or 6-membered phosphorus-containing heterocyclic rings containing carbon, oxygen and phosphorus in the heterocyclic ring. These compounds are good solvents for and are useful plasticizers for various synthetic resins, especially where low volatility is desired. They are also useful as assistants in the textile industry.

The novel compounds of this invention have structures corresponding to the general formula:

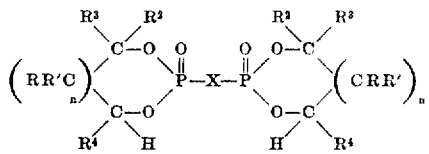

wherein R, R', $R^2$, $R^3$ and $R^4$, represents, respectively, a radical selected from the class consisting of hydrogen and the alkyl groups; and X designates a divalent substituted hydrocarbon radical having two terminal oxy groups respectively connected with a corresponding phosphorus atom, and selected from the class consisting of the divalent dioxyalkylene residues of the alkylene glycols and polyalkylene glycols, and corresponding residues of dihydric phenols, of biphenols, of diphenylolalkanes and of ditolylolalkanes; and $n=1$ or 0.

Among the divalent residues represented by X in the aforesaid formula are the following:

—O(CHR⁵)ₐO—
—(OCHR⁵CH₂)ₐO—
—(OCHR⁵CR₂⁶CHR⁵)ₐO—

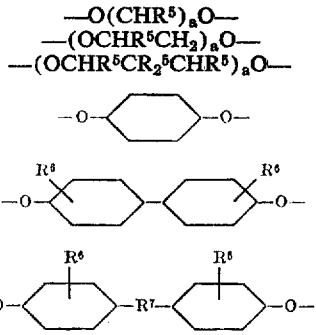

and wherein $R^5$ and $R^6$ respectively represent hydrogen or an alkyl group having from 1 to 10 carbon atoms; $R^7$ represents a divalent alkane residue having 1 to 10 carbon atoms, and $a$ is an integer.

The novel compounds of the invention can be produced by reacting an organic compound containing two functional groups, each having a replaceable hydrogen atom, such as an alkylene glycol or polyalkylene glycol, a dihydric phenol, a biphenol, a diphenylolalkane, a ditolylolalkane, and the like, with a 2-halo-substituted 2-oxo-1,3,2-dioxaphospholane, a 2-halo-substituted 2-oxo-1,3,2-dioxaphosphorinane, or a derivative thereof having one or more alkyl groups attached to a carbon atom or atoms of the heterocyclic ring.

Typical difunctional compounds useful in the process are the simple aliphatic glycols such as ethylene glycol, propylene glycol, the butylene glycols such as 1,3-butanediol, and the higher glycols containing up to 18 carbon atoms, such as 2,2-diethyl-1,3-propanediol, 2-butoxy - methyl - 2,4 - dimethyl - 1,5 - pentanediol, 1,6-hexanediol, 2,5-hexanediol, and 2-ethylhexanediol-1,3; the aliphatic polyglycols such as diethylene glycol, the dipropylene glycols, triethylene glycol, and the higher polyethylene glycols; the dihydric phenols, such as hydroquinone; aromatic diphenylolalkanes such as 2-(p,p'-diphenylol)propane, p,p'-diphenylolmethane and the p,p'-diphenylolbutanes; and biphenols, such as p,p'-biphenol and o,p'-biphenol.

It is possible to substitute in the process in the place of the difunctional compounds mentioned above the mono- or di-alkali metal salts of such compounds, as illustrated in Example 7. When an aryl compound such as a dihydric phenol, a diphenylolalkane, a biphenol and the like is one of the reactants, the use of the alkali metal salt is very convenient, and the reaction can be conducted at 25° C. or lower.

The 2-halo-2-oxo-1,3,2-dioxaphospholanes, 2-halo-2-oxo-1,3,2-dioxaphosphorinanes, and alkyl ring-substituted homologues thereof used as starting materials can be made by reacting a phosphoryl halide such as the chloride or bromide with a 1,2- or a 1,3-alkanediol, such as 1,2-propanediol or 1,3-hexanediol. If the diol is a solid at the reaction temperature, the reaction conveniently can be conducted in the presence of an inert solvent for the reactants. If desired, the reaction is conducted in the presence of a sequestering agent for the by-product hydrogen halide. The reaction desirably is conducted at temperatures around 25° C. or below, and preferably from around —10° C. to +25° C., by the slow addition of the glycol to the phosphoryl halide. The reaction mixture is filtered, if necessary, and the reaction mixture or filtrate is fractionally distilled under vacuum to isolate the desired product.

The reaction of the substituted 2-halo-2-oxo-1,3,2-dioxaphospholane or the corresponding dioxaphosphorinanes with the difunctional compounds hereindescribed can be conducted in the liquid phase, either below or above the boiling point of the more volatile reactant. Commonly reaction temperatures within the range from around 0° C. to 120° C. have been used advantageously. However, temperatures as low as —30° C. can be used, particularly in the presence of a tertiary amine such as pyridine, often used as sequestering agent for the hydrogen halide by-product of the reaction.

Usually, it is preferred to add one of the reactants to the other reactant, or to a solution thereof in a volatile solvent inert to the reactants and to the desired products, and in which the amine hydrochlorides formed are usually relatively insoluble, at a reaction temperature around 5° to 25° C., and then, if necessary, to complete the reaction at temperatures around 50° C. to 70° C. or higher.

During the reaction it is desirable to remove the by-product hydrogen halide as it is formed in order to favor the reaction and increase yields. This can be accomplished by the use of well-known hydrogen halide sequestering agents such as pyridine and other tertiary amines. After the reaction the insoluble hydrogen halide derivative of the sequestering agent is removed by filtration, and the filtrate is washed and treated to recover the desired product. This usually is accomplished by fractional distillation under vacuum.

The principal reaction can be illustrated by the following equations:

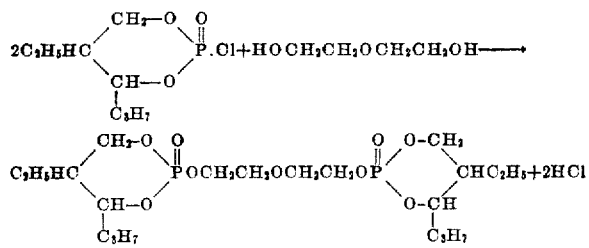

If desired, the novel compounds of the invention can be made by first reacting a phosphoryl halide and a compound of the type YXY where Y is hydrogen or an alkali metal and X represents a residue of the type hereinbefore designated; and the resultant reaction mixture, or the tetrahalodiphosphate derivative of YXY isolated therefrom, is reacted with the difunctional compound, as illustrated by the equations

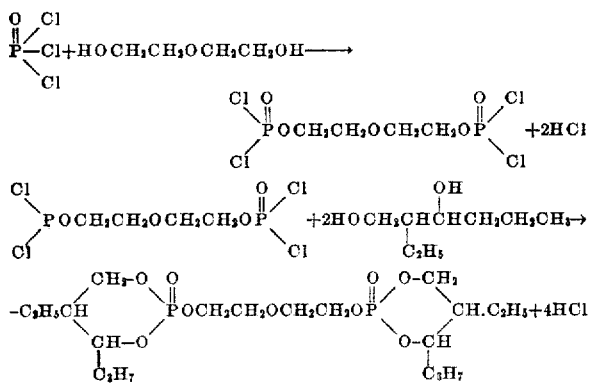

The following examples serves to illustrate the invention.

Example 1

2,2'-(1,3-butanedioxy)bis(4-methyl-2-oxo-1,3,2-dioxaphosphorinane) was prepared by the dropwise addition of 341 g. (2.0 mols) of 2-chloro-4-methyl-2-oxo-1,3,2-dioxaphosphorinane to an agitated solution of 90 g. (1.0 mol) of 1,3-butanediol, 237 g. (3.0 mols) of pyridine, and 500 cc. of benzene over a period of 45 minutes. It was necessary to cool the reaction mixture throughout the addition in order to maintain the reaction temperature at 25°–30° C. After the addition the reaction mixture was stirred at 25° C. for 4 additional hours, cooled to 5° C. and filtered. The filtrate was stripped by pot distillation at 100° C./2 mm. of mercury and further stripped at 180° C./0.2 mm. of mercury using a falling film type still. The brown, viscous, water-soluble residue had the following properties: acidity=0.38 cc. of N base/g.; $n_D^{30}$=1.4638; percent P (by weight)=17.86 (theory=17.29). The product had the apparent structure:

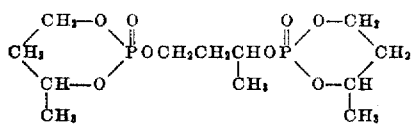

Example 2

During one hour 227 grams (1 mol) of 2-chloro-5-ethyl 2-oxo-4-propyl-1,3,2-dioxaphosphorinane were added slowly to a solution of 73 grams (0.5 mol) of 2-ethyl-1,3-hexanediol and 250 grams of benzyl chloride held at 55° C. under 40 mm. of mercury pressure. Afterwards the mixture was refluxed for 46 hours at 100° C. under 37 mm. of mercury pressure. The reaction mixture then was dissolved in 300 cc. of ethyl ether, and agitated with 300 grams of 10% aqueous sodium bicarbonate. The organic layer was decanted, washed with water, and stripped by pot distillation at a kettle temperature of 150° C. under less than 2 mm. of mercury pressure. The residual light broken liquid was 2,2'-(2-ethyl-1,3-hexanedioxy)-bis-(5-ethyl-2-oxo-4-propyl-1,3,2-dioxaphosphorinane). It has the following properties: specific gravity at 25°/15°=1.116; $n_D^{30°}$=1.4658; acidity=0.05 cc. of a normal solution of a base/gram. The yield was 87%, based upon either reactant; percent P (by weight)=11.76 (theory=11.76).

Example 3

63 grams (0.4 mol) of 2-chloro-4-methyl-2-oxo-1,3,2-dioxaphospholane were added dropwise to an agitated solution of 44 grams (0.2 mol) of 2-butoxymethyl-2,4-dimethyl-1,5-pentanediol, 32 grams (0.4 mol) of pyridine, and 250 cc. of ethylene dichloride, while cooling to maintain a temperature of 20°–25° C. The mixture was stirred at 25° C. for an additional 6 hours, and after standing overnight at 25° C. was cooled to −10° C. and filtered. The filtrate was stirred 2 hours at 25° C. with 10 grams of anhydrous sodium acetate and then was filtered. The filtrate was stripped by pot distillation at 50° C. under a pressure of 1 mm. of mercury. Seventy-four grams of 2,2'-(2-butoxymethyl-2,4-dimethyl-1,5-pentanedioxy)-bis-(4-methyl-2-oxo-1,3,2-dioxaphospholane)

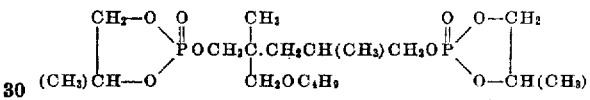

were secured as a viscous liquid residue having a refractive index $n_D^{30°}$=1.4576; a molecular weight of 467.5 (theory=458.4); and an acidity=0.22 cc. of normal base per gram, percent yield=80 (based on either reactant).

Example 4

2-2'-(3-oxa-1,5-pentanedioxy)-bis(5-ethyl-2-oxo-4-propyl-1,3,2-dioxaphosphorinane) was prepared by the dropwise addition of 0.96 mol of diethylene glycol tetrachlorodiphosphate to a solution of 271 g. (1.85 mols) of 2-ethyl-1,3-hexanediol and 250 g. of benzyl chloride at a reaction temperature of 55° C. under 40 mm. of mercury pressure absolute, over a period of 0.5 hour. After the addition the reaction mixture was maintained at 55° C. under 40 mm. pressure for 1 additional hour, allowed to stand 16 hours at 25° C. under a pressure of 2 mm. of mercury, and then refluxed at a kettle temperature of 98° C. under 35 mm. of mercury pressure for 8 hours. The reaction mixture was stripped by distillation at 100° C. under a pressure of less than 2.5 mm. of mercury, and the resulting residue was dissolved in 400 cc. of toluene, washed with dilute aqueous sodium bicarbonate, and then washed with water until neutral toward litmus paper. After stripping at 100° C. under a pressure of less than 2 mm. of mercury and filtering, the liquid residue was found to have the following properties: acidity=0.01 cc. of normal base/g.; percent yield=73 (based on the 2-ethyl-1,3-hexanediol); specific gravity 30°/15°=1.168; $n_D^{30°}$=1.4680, percent P (by weight) =12.57 (theory=12.74). The product has the apparent structure:

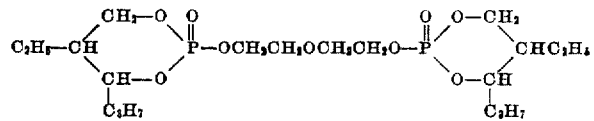

Example 5

2,2'-(3,6-dioxa-1,8-octanedioxy)-bis(5-ethyl-2-oxo-4-propyl-1,3,2-dioxaphosphorinane) was prepared by the dropwise addition of 1.0 mol of triethylene glycol tetrachlorodiphosphate to a solution of 292 g. (2.0 mols) of 2-ethyl-1,3-hexanediol and 250 g. benzyl chloride at a reaction temperature of 55° C. under an absolute pressure of 40 mm. of mercury over a period of 1 hour.

After the addition the reaction mixture was maintained at said temperature and pressure for 1 additional hour and then was refluxed at a reaction temperature of 96° C. under 33 mm. of mercury pressure for 8 hours. The reaction mixture was then stripped by distillation at 100° C. under less than 2 mm. of mercury pressure, and the residue was washed with 29% aqueous sodium hydroxide, then washed with water until neutral toward litmus paper, and stripped by distillation at 100° C. under less than 2 mm. of mercury pressure. The dark brown, fluid residue was found to have the following properties: acidity=0.004 cc. of normal base/g.; $n_D^{30°}=1.4674$; specific gravity 25/15=1.167; percent yield=44; percent P (by weight)=11.25 (theory=11.76). The product had the apparent structure:

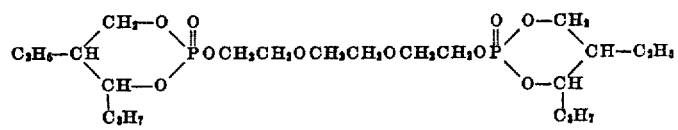

*Example 6*

2,2'-(3,6-dioxa-1,8-octanedioxy)-bis(5-ethyl - 2 - oxo-4-propyl-1,3,2-dioxaphosphorinane) was prepared by the dropwise addition of 227 g. (1.0 mol) of 2-chloro-5-ethyl-2-oxo-4-propyl-1,3,2-dioxaphosphorinane to an agitated solution of 75 g. (0.5 mol) of triethylene glycol, 158 g. (2.0 mols) of pyridine, and 400 cc. of benzene over a period of 20 minutes. It was necessary to cool the reaction mixture throughout the addition and for 30 minutes afterward in order to maintain the reaction temperature at 25°–30° C. After standing at 25° C. overnight the reaction mixture was filtered. The filtrate was washed with a solution of 40 g. of sodium hydroxide dissolved in 100 g. water, and then washed with ten 100 cc. portions of water. After stripping by distillation at 100° C. under an absolute pressure of less than 2 mm. of mercury, the 143 g. of brown, fluid residue was found to have the following properties: acidity=0.003 cc. of normal base/g.; $n_D^{30°}=1.4667$; specific gravity 25°/15° =1.168; percent yield=54.

*Example 7*

Two mols (453 grams) of 2-chloro-5-ethyl-2-oxo-4-propyl-1,3,2-dioxaphosphorinane were slowly added to an agitated 30% aqueous solution of the dipotassium salt of p,p'-isopropylidene diphenol containing one mol of the said salt, and maintained at 5° C. The reaction mixture then was held for 1 hour at 15°–20° C. Upon standing an oil layer separated, was withdrawn, and was dissolved in 600 cc. of ethyl ether. This solution was washed with aqueous sodium bicarbonate and then with water until neutral to litmus. The washed solution was pot distilled to a temperature of 150° C. under less than 2 mm. of mercury pressure. The residue, 2,2'-(p,p'-isopropylidenediphenoxy) bis(5 - ethyl-2-oxo-4-propyl-1,3,2-dioxaphosphorinane), had an acidity=0.11 cc. of normal base/gram; percent P (by weight)=9.70 (theory=10.17); $n_D^{30°}=1.5212$;

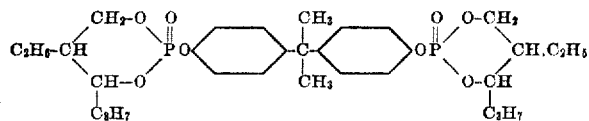

In similar manner, a 2-halo-2-oxo-1,3,2-dioxaphosphorinane reacts in the process (1) with hydroquinone to yield 2,2'-(p-phenylenedioxy)bis(2-oxo-1,3,2-dioxaphosphorinane; and (2) with p,p'-biphenol to yield 2,2'-(p,p'-biphenoxy)bis(2-oxo-1,3,2-dioxaphosphorinane).

The invention is susceptible of modification within the scope of the appended claims.

I claim:
1. Phosphrous-containing compounds of the general formula

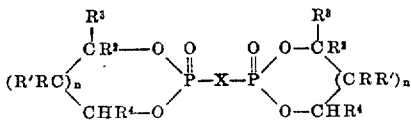

wherein R, R', R², R³ and R₄ represent, respectively, a radical selected from the class consisting of hydrogen and the lower alkyl groups; and X designates a divalent substituted-hydrocarbon residue having two terminal oxy groups respectively connected with different phosphorus atoms, said residue being selected from the class consisting of the divalent residues having two terminal oxy atoms and selected from the class consisting of the residues of the following: the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane group; and n is of the class consisting of 0 and 1.

2. Process which comprises reacting a compound selected from the class consisting of the unsubstituted and the heterocyclic ring lower alkyl-substituted 2-halo-2-oxo-1,3,2-dioxaphospholanes and the unsubstituted and the heterocyclic ring lower alkyl-substituted 2-halo-2-oxo-1,3,2-dioxaphosphorinanes with a difunctional organic compound selected from the class consisting of the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane group, and the alkali metal salts of said difunctional compounds.

3. Process which comprises reacting a compound selected from the class consisting of the unsubstituted and the heterocyclic ring lower alkyl-substituted 2-halo-2-oxo-1,3,2-dioxaphospholanes and the unsubstituted and the heterocyclic ring lower alkyl-substituted 2-halo-2-oxo-1,3,2-dioxaphosphorinanes with a difunctional organic compound selected from the class consisting of the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane group, and the alkali metal salts of said difunctional compounds, and removing the by-product hydrogen halide from the reaction mixture as formed.

4. Process which comprises reacting a compound selected from the class consisting of the unsubstituted and the heterocyclic ring lower alkyl-substituted 2-halo-2-oxo-1,3,2-dioxaphospholanes and the unsubstituted and the heterocyclic ring lower alkyl-substituted 2-halo-2-oxo-1,3,2-dioxaphosphorinanes with a difunctional organic compound selected from the class consisting of the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane group, and the alkali metal salts of said difunctional compounds, in the presence of an inert solvent for the reactants.

5. Process which comprises reacting a compound selected from the class consisting of the unsubstituted and the heterocyclic ring lower alkyl-substituted 2-halo-2-oxo-1,3,2-dioxaphospholanes and the unsubstituted and the heterocyclic ring lower alkyl-substituted 2-halo-2-oxo-1,3,2-dioxaphosphorinanes with a difunctional compound selected from the class consisting of the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane group, and the alkali salts of said difunctional compounds, in the presence of an inert solvent for the reactants and at a temperature within the range from around 25° C. to around 120° C.

6. Process which comprises reacting a compound selected from the class consisting of the unsubstituted and the heterocyclic ring lower alkyl-substituted 2-halo-2-oxo-1,3,2-dioxaphospholanes and the unsubstituted and the heterocyclic ring lower alkyl-substituted 2-halo-2-oxo-1,3,2-dioxaphosphorinanes with a difunctional organic compound selected from the class consisting of the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane group, and the alkali metal salts of said difunctional compounds, in the presence of an inert solvent for the reactants and of a sequestering agent for the hydrogen halide formed.

7. Process for making a phosphorus compound containing two heterocyclic phosphorus-containing radicals selected from the class consisting of the unsubstituted and the heterocyclic ring lower alkyl-substituted 2-oxo-1,3,2-dioxaphospholanyl and unsubstituted and the heterocyclic ring lower alkyl-substituted 2-oxo-1,3,2-dioxaphosphorinanyl radicals, which comprises reacting (1) a tetrahalodiphosphato ester of a difunctional organic compound selected from the class consisting of the alkylene glycols having up to 18 carbon atoms, the polyethylene glycols having up to 18 carbon atoms, the dipropylene glycols, the dihydric phenols, the biphenols, and the diphenylolalkanes and ditolylolalkanes having 1 to 10 carbon atoms in the alkane groups, with (2) a glycol of the class consisting of the 1,2-alkylene glycols and the 1,3-alkylene glycols having 2 to 18 carbon atoms.

8. Phosphorus-containing compounds as defined in claim 1, wherein at least one of the radicals represented respectively by $R^2$ and $R^3$ is hydrogen.

9. Phosphorus-containing compounds as defined in claim 1, wherein each $R^2$ and $R^3$ is hydrogen; and each $R^4$ is an alkyl group.

10. Phosphorus-containing compounds as defined in claim 1, wherein at least one of the radicals represented respectively by R and $R^1$ is an alkyl radical.

11. Phosphorus-containing compounds as defined in claim 1, wherein at least one of the radicals represented respectively by R and $R^1$, and each radical $R^4$, are alkyl radicals, and each $R^2$ and $R^3$, respectively, represents hydrogen.

12. Phosphorus-containing bi-heterocyclic compounds of the general formula

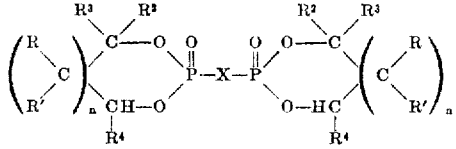

wherein R, R', $R^2$, $R^3$ and $R^4$, respectively, represent a radical of the class consisting of hydrogen and the lower alkyl groups; X designates a divalent residue of an alkylene glycol, said residue having two terminal oxy groups respectively connected with different phosphorus atoms and containing up to 18 carbon atoms; and n is of the class consisting of 0 and 1.

13. As a new compound, 2,2'-(2-ethyl-1,3-hexanedioxy)-bis(5-ethyl - 2 - oxo - 4 - propyl - 1,3,2 - dioxaphosphorinane).

14. As a new compound, 2,2'-(1,3-butanedioxy)-bis-(4-methyl-2-oxo-1,3,2-dioxaphosphorinane).

15. Phosphorus-containing bi-heterocyclic compounds of the general formula

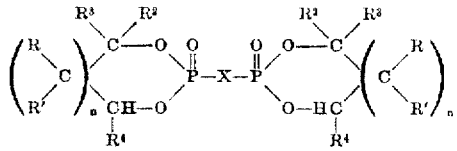

wherein R, R', $R^2$, $R^3$ and $R^4$, respectively, represent a radical of the class consisting of hydrogen and the lower alkyl groups; X designates the divalent residue of a polyethylene glycol having up to 18 carbon atoms; and n is of the class consisting of 0 and 1.

16. As a new chemical compound, 2,2'-(3-oxa-1,5-pentanedioxy) - bis(5 - ethyl - 2 - oxo - 4 - propyl - 1,3, 2-dioxaphosphorinane).

17. As a new chemical compound, 2,2'-(3,6-dioxa-1,8-octanedioxy) - bis(5 - ethyl - 2 - oxo - 4 - propyl - 1,3,2-dioxaphosphorinane).

18. As a new chemical compound, 2,2'-(p,p'-isopropylidenediphenoxy) - bis(5 - ethyl - 2 - oxo - 4 - propyl - 1,3, 2-dioxaphosphorinane).

References Cited in the file of this patent
UNITED STATES PATENTS

| | | |
|---|---|---|
| 2,495,108 | Kosolapoff | Jan. 17, 1950 |
| 2,632,767 | Smith et al. | Mar. 24, 1953 |
| 2,643,265 | Toy | June 23, 1953 |
| 2,661,366 | Gamrath et al. | Dec. 1, 1953 |